Figure 1:
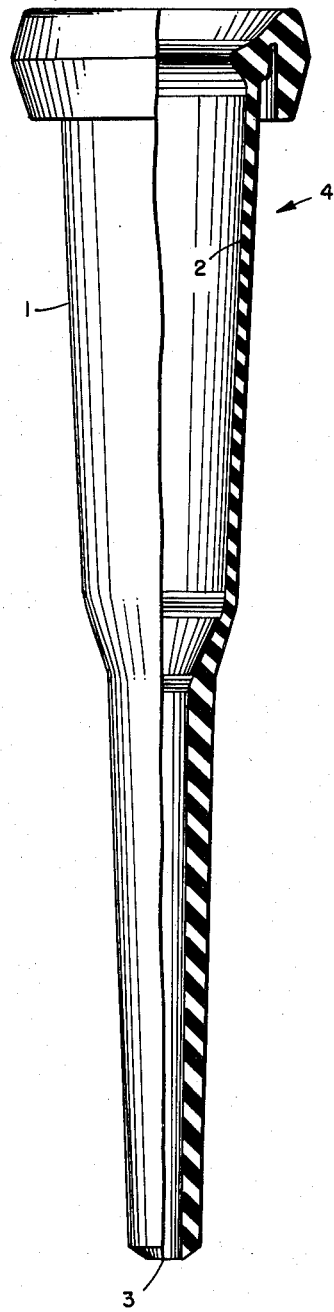

Aug. 2, 1960   D. D. BROWN   2,947,282
MICROBICIDAL ELASTOMER ARTICLES
Filed Aug. 6, 1958

INVENTOR:
DELMONT D. BROWN
BY Marshall, Johnston, Cook & Root
ATT'YS

2,947,282
MICROBICIDAL ELASTOMER ARTICLES

Delmont D. Brown, North Baltimore, Ohio, assignor to The D. S. Brown Company, North Baltimore, Ohio, a corporation of Ohio Filed Aug. 6, 1958, Ser. No. 753,505

11 Claims. (Cl. 119—14.47)

This invention relates to microbicidal elastomer articles and their manufacture, and particularly, to articles for contact with milk.

Modern dairy practice involves the use of milking machines which must be maintained as free from contamination as possible. The milking machines include a set of elastomer inflations or teat cup liners, which are commonly molded from natural or synthetic rubber. The milking machines, including the inflations, are washed between milkings and a sterilizing agent may be used. However, washing and sterilizing methods vary widely. At times, the equipment is thoroughly washed twice a day, but very frequently at least one wash consists only of a cold water rinse. At times, it has been found that rinsing after a milking is omitted.

Since milk furnishes an excellent nutrient medium for bacteria, the maintenance of the most sanitary conditions is highly desirable. Prior studies have shown that the rubber inflations harbor bacteria, which come from the skin of the animal or may come from infected animals, or are picked up in handling and when not in use. The bacteria contaminate the milk, and may also infect the animals. The situation is improved by using synthetic inflations, which build up lower bacterial concentrations than natural rubber. However, the presence of bacteria is a problem whatever type of inflation be employed, and the prior cleaning and sterilizing procedures are not as effective as desired. The situation is especially aggravated by improper cleaning procedures.

It is therefore a major object of the present invention to provide microbicidal milking machine parts, especially inflations, which combat these hazardous tendencies.

A particular object is to provide milking machine inflations which are bactericidal, or bacteriostatic, to at least prevent bacterial growth, and preferably, reduce the bacterial count on the surface and in the interstices of the inflations. The invention acts to maintain the sterility of the milk, and to prevent infection of the animals by contaminated inflations. In particular, mastitis in herds is combatted. The invention is also useful in other applications where milk is in contact with elastomeric articles, especially in handling and processing milk, as in rubber tubing, gaskets, liners, and other elastomeric articles which are contacted with milk. The margin of human error in the various applications is significantly reduced.

A further object is to provide bactericidal or bacteria-resistant elastomer articles which are active against the organisms encountered in handling milk and which articles retain their activity over repeated use.

Another object is to provide a microbicidal elastomer article from which the microbicidal agent is not substantially removed by water or milk.

Figure 2:
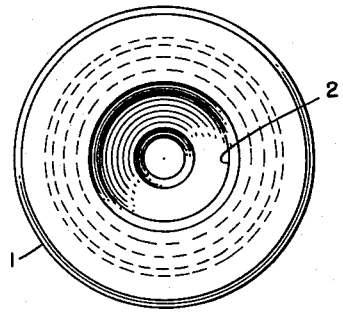

Additional objects are to provide a microbicidal elastomer article for contact with milk, a method of manufacture, and improvements in methods of handling milk and in dairy operations and the like. These and other objects, advantages and functions of the invention will be apparent on reference to the specification taken in conjunction with the attached drawing, in which Figure 1 is a side elevational and partly longitudinal sectional view of a microbicidal milking machine inflation according to the invention, having the same shape and appearance as a conventional inflation, and Figure 2 is a top plan view of the inflation.

The invention provides a cured microbicidal elastomer article employed in contact with milk and having dispersed therethrough a microbicidal agent. A preferred embodiment constitutes a milking machine inflation, as illustrated in the drawings. The microbicidal agent is intimately and substantially homogeneously dispersed throughout the inflation, such as the illustrative inflation 1, so that it does not appear as a separate element of the article, but is at least an extremely finely divided component thereof.

The illustrative embodiment shows one conventional inflation structure 1, but any of the several structures adapted for the several types of milking machines may be employed as well. The inflation is constructed to provide an enlarged cup or chamber 2 adjacent the top, for insertion of the teat. At the opposite end 3, the milk is removed by means of a vacuum connection, not shown. A steel shell or cup (not shown) is emplaced around the upper wide portion 4 of the inflation. A vacuum connection is provided in the shell, to perform the milking operation involving alternate expansions and contractions of the inflation in this area.

The invention also includes a method of manufacturing a microbicidal elastomer article which includes intimately incorporating a microbicidal agent in a raw elastomer mix, molding the resulting mix in the desired shape, and curing the molded mix. Thus, a microbicidal agent effective against the microorganisms associated with milk is dispersed substantially homogeneously by mixing, with raw rubber or the like, plasticizers, fillers and other conventional additives. The resulting mix is molded in the shape of the inflation, and the molded mix is cured. The inflation is then ready for repeated use in a milking machine. Improvements are likewise provided in other applications involving contact of milk with elastomer surfaces.

The invention contemplates the use of any microbicidal agent effective against the harmful or pathogenic microorganisms encountered in handling milk, which is preferably not more than slowly soluble in water and milk when present in the elastomer article. Phenolic microbicidal agents are very advantageously employed, especially those having but limited solubility in water. They may be employed as such or in the form of their salts. It is advantageous to employ the phenols as such, since their water solubility is reduced and they may be distributed very uniformly in the article due to their increased solubility in the organic components, such as the plasticizers. It also appears that the articles resulting from use of the phenols per se are more effective bactericidally. Other agents are contemplated, such as silver salts, e.g., silver chloride. The microbicidal agent should of course be nontoxic under the conditions of use and in the amounts employed.

Only a minor effective amount of the bactericide is incorporated in the elastomer article, sufficient to inhibit bacterial growth thereon, preferably about 0.25% to 20% by weight based upon the raw elastomer content of the article. A minimum proportion of about 2% is further preferred. The higher the concentration, the more rapid and complete is the kill of bacteria. Consequently, the preferred upper value may be exceeded in appropriate circumstances to further increase the effectiveness, provided that the concentration is not so high as to prevent the curing and formation of a satisfactory article.

The proportion is selected so as to not unduly interfere with curing or vulcanizing the molded mix in the shape or form of the desired article. The curing of natural rubber is apparently affected more by higher proportions than the curing of the synthetic rubbers. Some increase in curing time is tolerable in view of the results provided by the bactericidal article.

Milking machine inflations according to the invention have undergone a number of tests which have demonstrated their effectiveness. Several of these tests are summarized in the examples which follow, for purposes of illustration. The results showed that the inflations successfully combatted the bacteria commonly encountered, to furnish increased safety and guard against contamination of milk and of the animals. The results were especially good with the preferred neoprene inflations, and the utility of other synthetics and natural rubber was demonstrated. The invention thus contemplates articles constructed of suitable elastomers including natural rubber and synthetic elastomers such as neoprene, Butyl rubber, Buna S, Buna N, Thiokol rubberlike polymers, and polyurethane.

The following examples are furnished to provide a more complete understanding of the invention, but it is to be understood that the invention is not limited to the components, proportions and conditions set forth therein, which are only illustrative.

*Example 1*

The inflations used in subsequent examples were produced by incorporating the bactericidal agent in the raw rubber mix, followed by molding and curing or vulcanizing. Thus, the raw rubber solid was masticated in a mill or mixer until plastic. Then, the bactericide, and conventional plasticizers, fillers, accelerators and other additives were added, followed by mixing for 3–15 minutes. The proportions of the bactericide were calculated in percentages by weight, based on the amount of raw rubber solid employed. An oil-soluble bactericide, such as o-phenylphenol, may be dissolved or dispersed in the plasticizer for incorporation in the mix. The agent may be melted and the liquid mixed with the plasticizer, or the solid agent may be intimately dispersed. This compounded rubber stock is molded in the shape or form of an inflation and then cured in the usual manner, e.g., with steam at 287° F. under pressure, for 20–30 minutes.

*Example 2*

Two standard types of neoprene (G) inflations containing from 0.25% to 2% of sodium o-phenylphenol were tested for bactericidal activity against *Escherichia coli*, *Staphylococcus aureus*, and a Pseudomonas species isolated from a mastitis case, in suspension in physiological saline. These organisms are commonly found in milk. *E. coli* is representative of intestinal disorders which are carried into milk. Pseudomonas is a very troublesome organism found in mastitis cases and difficult to eliminate. Any reduction of the organisms is considered quite beneficial.

The inflations were filled with the saline suspensions of the individual organisms and allowed to stand under atmospheric conditions. High concentrations of the organisms were used, to provide severe tests. Samples of the liquid were removed from the inflations after standing for periods of time, plated, incubated, and the colonies of bacteria counted.

At 0.25% of bactericide, progressive reduction of the bacteria count resulted over a 24-hour period, from 6 million to less than 10 thousand for *E. coli*, and from 9.4 million to 1.5 million for *S. aureus*. The Pseudomonas count was reduced but not significantly.

At 0.5% of bactericide, the results were comparable for *E. coli* and considerably better for *S. aureus*, from 9.4 million to 1.4 million in one hour, and to less than 10 thousand at 3 and 24 hours. Pseudomonas reduced from 5.2 million to 2 million in 24 hours.

At 2% of bactericide, the results were improved for *E. coli*, the count being reduced to 400 thousand in one type inflation and less than 10 thousand in the other at 3 hours, both being less than 10 thousand at 24 hours. Pseudomonas reduced from 5.2 million to about 3 million in 24 hours.

*Example 3*

Inflations having various quantities of either o-phenylphenol or sodium o-phenylphenol were tested for bactericidal activity in the manner of Example 2 against a Pseudomonas species and *Staph. aureus*. The Pseudomonas suspension in saline had a count of 1.75 million at the start and the control (in a glass container) a count of 2 million at 24 hours. The Staph. suspension in saline had a count of 1.2 million at the start and the control a count of 4.4 million at 24 hours, indicating multiplication on cellular debris.

Neoprene (G) inflations containing 0.25% to 5% o-phenylphenol reduced the Pseudomonas count to about 0.1 to 0.2 of the initial count in 3–4 hours, and the counts were further reduced in 24 hours, to 27 thousand in the case of 5% bactericide. Multiplication of the Staph. took place in 1 hour, and reduction had commenced in 3–4 hours. At 24 hours, the count was very low in each case, 75 thousand or lower.

Neoprene (G) inflations containing 2% and 5% sodium o-phenylphenol reduced the Pseudomonas count well, though not so well as with o-phenylphenol. With 2% and 5% of sodium o-phenylphenol, the Staph. count was reduced well, but apparently not so rapidly as with o-phenylphenol.

For comparison, neoprene (G) was tested with no inclusion of bactericide. The Pseudomonas count reduced slightly at 24 hours, and the Staph. count was greater than 3 million at 24 hours.

*Example 4*

Natural rubber inflations containing 2% to 4% of o-phenylphenol were tested for activity against *E. coli*. saline suspension filling the inflations. The suspension had an initial bacterial count of 304 thousand. A control was maintained in a glass container, and comparison was also made with an untreated natural rubber inflation. The results were tabulated below.

| Time, hrs. | Control | Un-treated Rubber | Treated Rubber | | |
| --- | --- | --- | --- | --- | --- |
| | | | 2% | 3% | 4% |
| 0 | 304 T | | | | |
| 3 | 460 T | 230 T | 51 T | 68 T | 20 T |
| 9 | 241 T | 98 T | 3.7 T | 0.1 T | 0 |
| 121 | 130 T | 92 T | 0.2 T | 0 | 0 |

*Example 5*

Inflations constructed of other types of rubber and containing a bactericide were tested for activity. Neoprene (W) containing 5% of o-phenylphenol or 5% of sodium o-phenylphenol reduced the bacterial count of *Staph. aureus* and a Pseudomonas species isolated from chicken wattel disease, well below a neoprene (W) control containing no bactericide, in 24-hour tests.

In tests against *Staph. aureus*, with an initial bacterial count of 200 thousand, Buna S containing 5% or 6% of o-phenylphenol apparently produced a complete kill and 4% of the agent resulted in a count of 100, in 24 hours. Butyl rubber produced a complete kill in 24 hours at 6% and a count of 100 at 5% of o-phenylphenol. The controls (glass containers) showed increase due to multiplication or cell division.

Example 6

Since it is desirable to produce kill as rapidly as possible, preferably within the average time between milkings (10–12 hours), higher concentrations of o-phenylphenol were evaluated. It was found that for such articles, the preferred concentration of active agent is about 10% to 15%.

As regards the manufacture of the articles, the vulcanization of neoprene was retarded but not excessively at 15% concentration, and the articles had satisfactory properties.

Test results with duplicate neoprene inflations, evaluated as in Example 2, are shown in the table following.

| Concentration of agent | Bacterial Count | | | | | |
|---|---|---|---|---|---|---|
| | 0 hr. | 1 hr. | 2 hrs. | 5 hrs. | 6 hrs. | 24 hrs. |
| *Staph. aureus* | | | | | | |
| Glass control (0%) | | | 1,200 T | | 970 T | 354 T |
| Neoprene control (0%) | | | 640 T | | 150 T | 500 |
| 12% | | | 500 T | | 35 T | 27 T |
| 12% | | | 330 T | | 35 T | ³ 1,000 |
| 15% | | | 30 T | | ³ 10 T | ³ 1,000 |
| 15% | | | 85 T | | 10 T | ³ 1,000 |
| 15% ¹ | | | 160 T | | ³ 10 T | ³ 1,000 |
| 15% ² | | | ³ 60 T | | ³ 10 T | ³ 1,000 |
| *E. Coli.* | | | | | | |
| Glass control (0%) | | | 20 T | | 3,340 T | 47,000 T |
| Neoprene control (0%) | | | 40 T | | 10 T | 1,000 |
| 12% | | | 85 T | | ³ 10 T | ³ 1,000 |
| 12% | | | 65 T | | ³ 10 T | ³ 1,000 |
| 15% | | | 20 T | | ³ 10 T | ³ 1,000 |
| 15% | | | 35 T | | ³ 10 T | ³ 1,000 |
| 15% ¹ | | | 15 T | | ³ 10 T | ³ 1,000 |
| 15% ² | | | ³ 10 T | | ³ 10 T | ³ 1,000 |
| *Pseudomonas* | | | | | | |
| Glass control (0%) | 630 T | 735 T | | 262 T | | 10 T |
| Natural rubber control (0%) | | 620 T | | 384 T | | 30 T |
| Neoprene control (0%) | | 520 T | | 420 T | | 3 T |
| 12% | | 540 T | | 154 T | | ³ 100 |
| 12% | | 450 T | | 327 T | | ³ 100 |
| 15% ² | | 790 T | | 20 T | | ³ 100 |
| 15% | | 425 T | | 65 T | | ³ 100 |
| 15% ¹ | | 690 T | | 62 T | | ³ 100 |
| 15% | | 785 T | | 48 T | | ³ 100 |

¹ Rubber accelerator changed to vary curing.
² Plasticizer omitted for increased hardness.
³ Less than.

Example 7

A series of four standard types of neoprene milking machine inflations into which had been incorporated from 0.25% to 2% of sodium o-phenylphenol was tested for bactericidal activity. A second series of the inflations was also tested, which contained 0.25% to 2% of diisobutyl phenoxy ethoxy ethyl dimethyl benzyl ammonium chloride, monohydrate.

Soured milk was allowed to dry on the surface of the inflations. After eight hours, the surface of each was swabbed and plated on a nutrient medium to determine the presence of bacteria. No living microorganisms were found.

Simulated field tests with raw milk showed improved results when the new inflations containing 15% o-phenylphenol were employed and the inflations were washed with a sterilizing solution after each use, over the use of standard inflations washed in the same manner.

Example 8

Field tests were conducted with milking machine inflations on a number of farms over a period of several months, comparing neoprene inflations containing 12% and 15% o-phenylphenol with neoprene and natural rubber inflations containing no bactericidal agent. Use of the inflations containing bactericidal agent resulted in an average bacterial count of one-half the average count on the controls.

The effectiveness of the articles is maintained by gradual migration or diffusion of the microbicidal agent to the surface of the elastomer following depletion of the quantity of agent present at the surface. The occurrence of such migration in rubber has previously been recognized, as described for example in Reissue Patent No. 20,337.

The invention thus provides substantial improvements in handling milk, and a cured microbicidal elastomer article which is effective against the microorganisms found in milk. An especially useful microbicidal milking machine inflation is provided. The invention is very desirable for protecting equipment against bacterial growth due to inadequate sanitation and cleaning methods. The article contains the microbicidal agent therein for effective use over a number of operations.

The invention is hereby claimed as follows:

1. A cured microbicidal elastomer article employed in contact with milk and having dispersed therethrough at a microbicidally active level a microbicidal agent which is safe for human consumption of the milk at said level.

2. A cured microbicidal elastomer milking machine inflation having dispersed therethrough at a microbicidally active level a microbicidal agent which is safe for human consumption of the milk at said level.

3. A cured microbicidal elastomer milking machine inflation having dispersed therethrough at a microbicidally active level a microbicidal phenol which is safe for human consumption of the milk at said level.

4. A cured microbicidal elastomer milking machine inflation having dispersed therethrough at a microbicidally active level a microbicidal agent which is safe for human consumption of the milk at said level, said microbicidal agent comprising an orthophenylphenol in a proportion of about 0.25% to 20% by weight based upon the raw elastomer content of the article.

5. A cured microbicidal neoprene rubber milking machine inflation having dispersed therethrough at a microbicidally active level a microbicidal agent which is safe for human consumption of the milk at said level, said microbicidal agent comprising an orthophenylphenol in a proportion of about 0.25% to 20% by weight based upon the raw rubber content of the article.

6. A cured microbicidal Buna S rubber milking machine inflation having dispersed therethrough at a microbicidally active level a microbicidal agent which is safe for human consumption of the milk at said level, said microbicidal agent comprising an ortho-phenylphenol in a proportion of about 0.25% to 20% by weight based upon the raw rubber content of the article.

7. A cured microbicidal Butyl rubber milking machine inflation having dispersed therethrough at a microbicidally active level a microbicidal agent which is safe for human consumption of the milk at said level, said microbicidal agent comprising an ortho-phenylphenol in a proportion of about 0.25% to 20% by weight based upon the raw rubber content of the article.

8. A cured microbicidal natural rubber milking machine inflation having dispersed therethrough at a microbicidally active level a microbicidal agent which is safe for human consumption of the milk at said level, said microbicidal agent comprising an ortho-phenylphenol in a proportion of about 0.25% to 20% by weight based upon the raw rubber content of the article.

9. A milking machine part constructed of a cured microbicidal elastomer having dispersed therethrough at a microbicidally active level a microbicidal agent which is safe for human consumption of the milk at said level.

10. A milking machine part constructed of a cured microbicidal elastomer having ortho-phenylphenol dispersed therethrough at a microbicidally active level which is safe for human consumption of the milk.

11. A cured microbicidal elastomer milking machine inflation having ortho-phenylphenol dispersed therethrough at a microbicidally active level which is safe for human consumption of the milk.

References Cited in the file of this patent

UNITED STATES PATENTS 2,302,443    Hodsdon            Nov. 17, 1942

OTHER REFERENCES

G-11 (Hexachlorophene), May 1952, Sindar Corporation. Abstracts 24 and 33, pages 5 and 6.